May 13, 1941.　　　　E. SCHULZ　　　　2,241,744
LAWN EDGING DEVICE
Filed Feb. 15, 1939
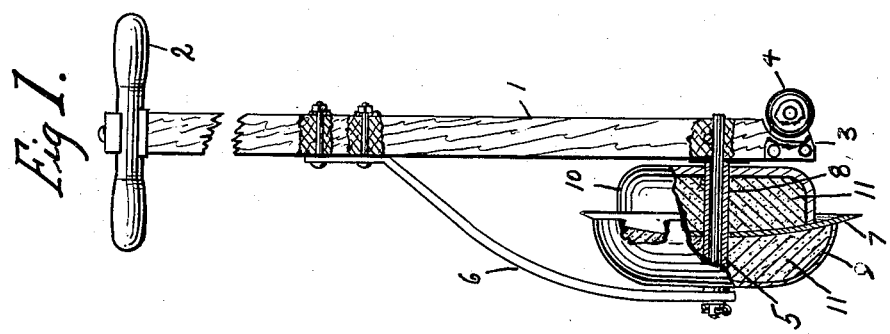
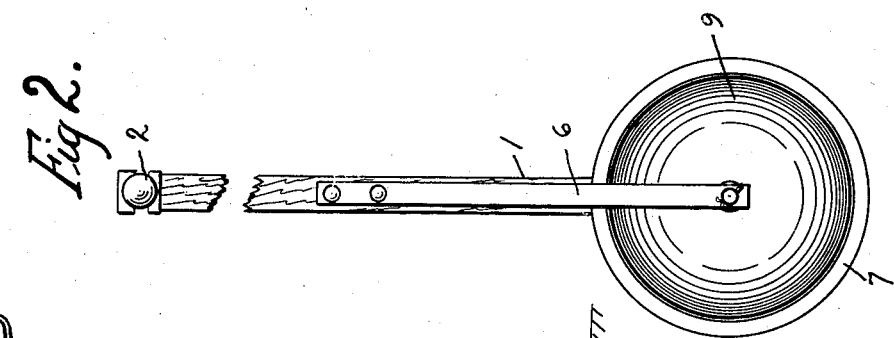
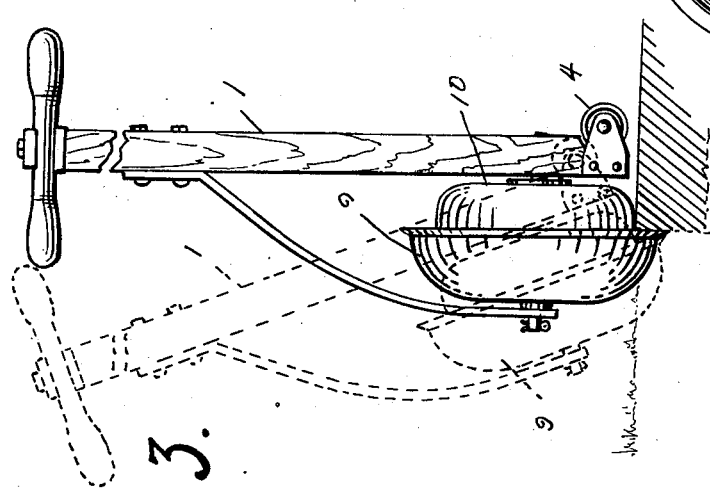
INVENTOR.
Edward Schulz
BY Arthur H. Ewald,
ATTORNEY.

Patented May 13, 1941

2,241,744

UNITED STATES PATENT OFFICE 2,241,744

LAWN EDGING DEVICE

Edward Schulz, Aurora, Ind.

Application February 15, 1939, Serial No. 256,589

1 Claim. (Cl. 97—227)

My invention relates to lawn edging devices and has reference particularly to the provision of a device for the trimming or edging of a lawn along a sidewalk, garden, or under other similar conditions.

The principal object of the present invention is to provide a tool of simple and inexpensive construction whereby it is possible to trim the grass along the edge of a sidewalk or similar structure with a minimum of time and effort.

Other objects of the invention will appear from the following detailed description thereof.

In the drawing:

Figure 1 is an elevation of my new lawn trimming device taken from the front thereof, parts being shown in section.

Figure 2 is a side elevation of said device.

Figure 3 is an elevation illustrating the use of the device.

The numeral 1 indicates a standard similar to the standard of a lawn mower, and having the usual cross bar or handle 2 for use in operation of the device, on its upper end. Mounted between brackets 3 on the lower end of the standard 1 is a wheel 4 which is adapted to be used when moving the device from place to place for use.

Mounted near the lower end of the standard 1 is a shaft 5 which extends at right angles from the shaft on the opposite thereof from the wheel 4. The outer end of the shaft 5 is secured in and supported by a bar 6, the other end of which is secured near the upper end of the standard 1.

The cutting element of my device consists of a dished highly tempered disc 7 which is mounted on a sleeve or hub 8 between dished supporting members 9 and 10, the latter being also mounted on the hub 8. The members 9 and 10 are deep, as shown in Figure 1 and of considerable internal capacity and are filled with concrete 11 or other material of great weight.

In Figure 3 I have illustrated the use of my new lawn trimming device. As shown therein when it is desired to edge the lawn along a walk, the operator places the device so that the cutter will travel along the edge of said walk, the standard being to the inside, that is over the walk, and he merely pushes the device forward, the member 10 riding on the walk and the cutter moving along the edge and trimming the grass to be cut. During this operation the weight of the device by reason of the concrete holds it down in effective operating contact with the walk and lawn edge. In the position illustrated in broken lines the device is useful for turning back the soil or sod adjacent the walk. For securing this effect the operator merely rotates the standard by turning the handle 2 in a clockwise direction for a short distance. This inclines the cutter disc outwardly from the edge of the walk, as shown in broken lines and the entry of the cutter between the edge of the soil and the walk causes the soil during the forward movement of the cutter to be pushed back away from the walk as will be obvious.

When the end of line to be edged is reached, the operator may merely rotate the handle on the axis, 5, the member 10 remaining on the walk to the other side of the cutter and return along the line which has just been trimmed either for better trimming or for the purpose of pushing back the soil as just mentioned.

It will be obvious that the cutter 7 is self sharpening as it passes along the edge of a cement walk or similar structure.

It will also be obvious that by reason of the larger dimension of the outer member 9 of the device, the outer side is of greater weight than the inner side represented by the member 10; this tends to hold the blade inwardly against the edge of the walk and gives increased cutting efficiency.

It will also be obvious that when the trimming of an edge has been completed and it is desired to remove the device to another point, the cutter section is raised by throwing the handle over so that the device rides on the wheel 4. This movement is facilitated by reason of the fact, also, that the member 10 is of reduced diameter so that during the tilting, the inner edge thereof does not strike the walk. When the device has been so tilted, it may be moved from place to place on the roller 4.

Having thus fully described my device, what I claim as new and desire to secure by Letters Patent is:

A lawn edging device, comprising a handle, a concavo-convex disc cutter rotatably mounted thereon, a weighted cylinder mounted between said disc and handle and adapted to rotate with said disc, said cylinder being of considerably smaller diameter than said disc, and a weighted member mounted on the opposite side of said disc and adapted to rotate therewith, said member being of substantially hemispherical shape and of diametric dimension intermediate said cylinder and disc.

EDWARD SCHULZ.